No. 610,236. Patented Sept. 6, 1898.
A. JOHNSEN.
VELOCIPEDE DRIVING GEAR.
(Application filed July 30, 1897.)
(No Model.)
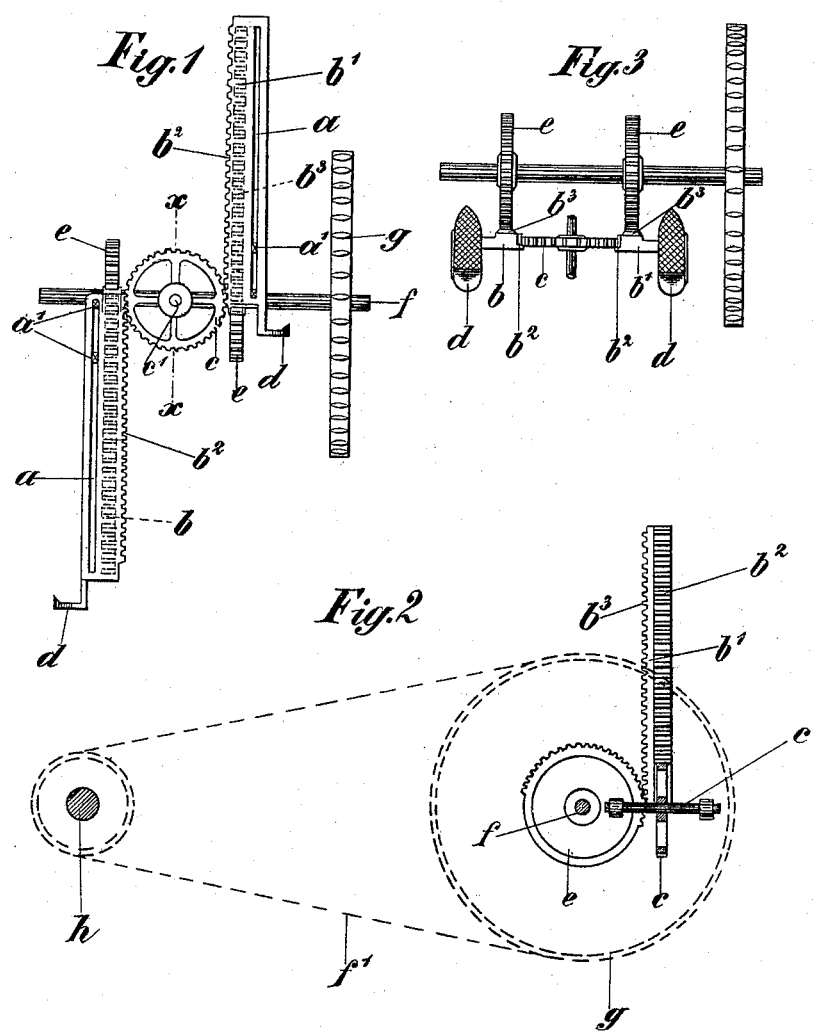
Witnesses:
K. E. Detzner.
Paul Voller
Inventor:
Adolf Johnsen

UNITED STATES PATENT OFFICE.

ADOLF JOHNSEN, OF ADELBY, GERMANY.

VELOCIPEDE DRIVING-GEAR.

SPECIFICATION forming part of Letters Patent No. 610,236, dated September 6, 1898.

Application filed July 30, 1897. Serial No. 646,540. (No model.)

*To all whom it may concern:*

Be it known that I, ADOLF JOHNSEN, pastor, of Adelby, near Flensburg, in the Kingdom of Prussia, German Empire, have invented new and useful Improvements in Driving-Gears for Velocipedes and Like Vehicles, of which the following is a specification.

My invention relates to a driving-gear for velocipedes, carriages, and the like whereby a rotary motion is transmitted to the driving-shaft and the locomotion of the vehicle effected simply by the up-and-down movement of two bilateral racks, each of them furnished with a pedal, the said racks also engaging with an intervening toothed wheel.

In the accompanying drawings, Figure 1 is a front view; Fig. 2, a section through line $x\ x$ of Fig. 1, and Fig. 3 a plan of Fig. 1.

I provide two racks $b\ b'$, having slots $a$, running on pins $a'$, and the teeth $b^2$ of the said racks engage with a toothed wheel $c$ in such manner that when the rack $b$ moves downward the rack $b'$ is moved upward, and vice versa, the upward and downward movements of the racks being brought about by the pedals $d$, which are fixed for this purpose to the lower ends of the racks. The racks $b\ b'$ are also provided with side teeth $b^3$, which engage alternately with the toothed wheels $e$. These wheels are only toothed on half their circumference and are rigidly attached to the shaft $f$, their position being such that they are only in gear with the downward-moving rack, during which time the second rack can move upward without hindrance. A chain-wheel $g$ on the shaft $f$ transmits through chain $f'$ the rotary movement of the shaft $f$ to the driving-shaft $h$. The bearing of the shaft $c'$, carrying the toothed wheel $c$, as well as that of the shaft $f$, may be constructed in any manner suited to the frame of the cycle or other vehicle.

Having now described my invention, what I claim, and desire to secure by Letters Patent, is—

In the driving-gear described, the combination of the shaft $f$ to be driven, the parallel wheels $e$ fixed on said shaft and each having one half of its periphery toothed and the other half smooth, the peripherally-toothed wheel $c$ mounted on a shaft and disposed at right angles to the wheels $e$ and arranged between the longitudinal vertical planes of said wheels $e$ and the vertically-movable, pedal-racks disposed at opposite sides of the wheel $c$ and in the same vertical planes as the wheels $e$; the said racks each being formed in one piece and having teeth on their inner sides in mesh with those of the wheel $c$ and teeth on their faces or sides contiguous to wheels $e$ adapted to mesh with the teeth of said wheels $e$ and also having longitudinal slots for the reception of guide-pins, substantially as specified.

In testimony that I claim the foregoing as my invention I have signed my name in presence of two subscribing witnesses.

ADOLF JOHNSEN.

Witnesses:
   G. MULLER,
   RÖPKE.